2,713,031

METHOD OF PREPARING A DRILLING MUD ADDITION AGENT

Walter P. Green, Jr., Laurel, and Harold O. Walker, Ellisville, Miss., assignors to Masonite Corporation, Laurel, Miss., a corporation of Delaware No Drawing. Application May 29, 1952, Serial No. 290,837

5 Claims. (Cl. 252—8.5)

The present invention relates to drilling mud compositions and relates more particularly to a novel and improved method of preparing a particular class of drilling mud addition agents. Even more particularly, the invention relates to a novel and improved method of preparing a dry, relatively free-flowing drilling mud addition agent consisting essentially of an alkali metal molecularly dehydrated phosphate and a carbohydrate mixture derived from thermohydrolytically treated lignocellulose.

In copending application Serial No. 288,536, filed May 17, 1952, by Edwin H. Brink and Harold O. Walker, there is described a class of drilling mud addition agents consisting of an alkali metal molecularly dehydrated phosphate and a carbohydrate mixture consisting essentially of oligosaccharides composed of arabinose, mannose, galactose, glucose, and xylose sugar units. It is pointed out in that application that a mixture of from about 10% to about 50% by weight of a member of the above mentioned class of phosphates together with from about 90% to about 50% by weight of the above mentioned oligosaccharide mixture provides a particularly desirable drilling mud addition agent. Bentonitic drilling mud compositions treated therewith are characterized by greatly improved viscosity and gel strength reduction together with outstanding controlability. Usually, the above described drilling mud addition agents are prepared by mixing together the desired amount of phosphate and an aqueous solution of oligosaccharide. The agents may also be prepared by first reducing the oligosaccharide mixture to a dry powder and admixing therewith the selected phosphate. The addition agents are employed in amounts ranging from about 0.0025% to about 0.2% based on the volume of mud, i. e. corresponding to about 0.0087 to about 0.7 pound of addition agent per 42 gallon barrel of mud. Mud compositions treated with the above amounts of addition agent are characterized by low viscosity and gel strengths throughout the entire well-drilling procedure. The improvements obtained in these mud characteristics are also retained regardless of the inorganic contaminants encountered, such as calcium salts and the like, which ordinarily seriously interfere with the drilling operations.

It has now been discovered that the above described class of drilling mud addition agents may be greatly improved by carefully controlling the method of their preparation. Generically, the invention comprises the preparation of an aqueous mixture of an alkali metal molecularly dehydrated phosphate and an oligosaccharide mixture, and rapidly drying the solid components thereof by a spray drying procedure or an equivalent flash drying operation. The product, a finely divided relatively free-flowing powder, is characterized by viscosity and gel strength reducing properties which are greatly improved over those disclosed in the above mentioned copending application.

In carrying out the method of the invention, any of the commercially available flash drying apparati may be employed. There are no critical factors involved in drying the oligosaccharide-phosphate mixture other than the necessity of employing temperatures somewhat below the decomposition temperature of the oligosaccharide mixture, i. e. temperatures lower than about 165° C. Ordinarily, the drying temperatures employed are within the range of from about 100° C. to about 125° C. or slightly higher. The feed rate and solids content of the aqueous mixture are not critical and depend upon the spray head or inlet nozzle of the particular apparatus employed. For practical purposes it may be preferable to employ aqueous mixtures having a solids content of from about 40% to about 50% since this range is productive of products having the most desirable bulk densities. However, solids contents either lower or higher than 40-50% may be employed without alternating the viscosity and gel strength reducing properties of the product.

The manner in which the above flash drying method functions in the provision of the greatly improved addition agents of the present invention is not known. From the totally unexpected outstanding improvements obtained, it is believed that some degree of chemical reaction may occur between the phosphate and the carbohydrate components. The method of the present invention is not to be construed, however, as dependent upon the presence or absence of chemical reaction between the components since there is no analytical data which sustains or repels this theory.

The oligosaccharide mixture which is employed in the present invention is obtained from thermohydrolytically treated lignocellulose. The starting material comprises the water-soluble portion of lignocellulose which has been subjected to thermal hydrolysis at elevated temperatures and pressures. It may also be obtained by acid hydrolysis of wood or woody materials as well as by the ordinary saccharification of such materials.

One of the preferred methods of obtaining the water-soluble oligosaccharide mixture of the present invention, particularly from the viewpoint of commercial availability of raw material, is that described in United States Patent No. 1,824,221, issued September 22, 1931, to William H. Mason. In that invention, chips or small pieces of wood of trees and woody materials of corn stalks, cane, and other vegetable growths are first charged into a closed chamber. Thereafter the chips are subjected to pressure of about 200-1200 p. s. i. and a temperature of about 200°-300° C. for approximately 30 minutes to 5 seconds respectively, in the presence of steam, and the material is then discharged from the chamber through a constricted discharge means therein into a zone of lower pressure (preferably atmospheric pressure), thereby exploding the wood chips into comparatively finely divided elongated fibers and bundles of fiber. Under this treatment the wood undergoes hydrolysis, and water-insoluble and readily hydrolyzable constituents thereof are rendered soluble or dispersible or suspendible in water. The water-soluble portion ordinarily contains about 60-80% of pentosans and hexosans, 5-15% of non-sugar carbohydrates, 5-25% of lignin, and 2-8% of gums. Relatively concentrated aqueous solutions of these solubles are known in the trade as Masonex while the dried material is known as Masonoid.

That phosphates which are suitable in the novel method of this invention comprise the alkali metal molecularly dehydrated phosphates such as sodium acid pyrophosphate, sodium hexametaphosphate, sodium tetraphosphate, sodium metaphosphate, tetrasodium pyrophosphate, sodium tripolyphosphate, and the like phosphates which are characterized by their ability to revert to the orthophosphate form in the presence of water.

In using the addition agents in conjunction with drilling muds, the amounts necessary to obtain the desired results are much smaller than those stated above in connection with copending application Serial No. 288,536. In most instances, it is only necessary to employ about ⅕ as much of the flash dried product of this invention as is necessary in the case of the similar addition agent which is admixed in dry condition or which is prepared and employed as an aqueous solution without drying. In all instances, addition agents prepared according to the method of the present invention are at least about 2.5 times as effective as those heretofore known. This feature will be hereinafter pointed out with more particularity.

The invention will be further illustrated by the following specific examples.

*Example 1*

4700 pounds of addition agent was prepared by adding to an aqueous solution of an oligosaccharide mixture, i. e. Masonex, sufficient sodium acid pyrophosphate to produce a solution having a solids content of approximately 42%, in which the solids consisted of 80% by weight of carbohydrate material and 20% by weight of phosphate. The material was then spray dried, the drier cabinet being maintained at a temperature of 110° C.–115° C.

Wyoming bentonite was slurried in water in the proportion of about 7.3 parts to 100 parts of distilled water. The slurry was stirred for 1.5 hours and then allowed to stand for 24 hours to reach equilibrium. Thereafter, 800 cc. samples of mud, containing varying amounts of the above addition agent, were withdrawn and evaluated for viscosity and gel strength. In the following table, viscosity values were obtained with a Stormer viscosimeter. Measurements are given in centipoises at 600 R. P. M. Gel strength was also evaluated with the same viscosimeter. The physical data was obtained according to the procedure described in the American Petroleum Institute Bulletin entitled "API–RP 29 (3rd edition)" with the exception that tests were made immediately after addition of the oligosaccharide-sodium acid pyrophosphate mixture and also after an incubation period of 24 hours at 180° F.

The spray dried addition agent was added to the mud as a 10% aqueous solution. Comparative samples were evaluated using a 10% aqueous solution of agent without any spray drying treatment. The results are tabulated below.

[80% oligosaccharide–20% sodium acid pyrophosphate.]

INITIAL RESULTS—SPRAY DRIED

| Percent Addition Agent, by volume | None | 0.0025 | 0.01 | 0.04 | 0.1 |
|---|---|---|---|---|---|
| Lbs. Addition Agent, per barrel mud | None | 0.0087 | 0.035 | 0.14 | 0.35 |
| Viscosity, Centipoises at 600 R. P. M | 39 | 34 | 28 | 21 | 21 |
| Gel Strength, Initial, Gms | 16 | 9 | 4 | 4 | 4 |
| Gel Strength, 10 Min., Gms | 54 | 49 | 40 | 4 | 4 |

INITIAL RESULTS—NOT SPRAY DRIED

| Viscosity, Centipoises at 600 R. P. M | 39 | 37 | 32 | 27 | 23 |
|---|---|---|---|---|---|
| Gel Strength, Initial, Gms | 16 | 7 | 4 | 2 | 2 |
| Gel Strength, 10 Min., Gms | 59 | 49 | 32 | 4 | 2 |

AFTER 24 HR. AT 180° F.—SPRAY DRIED

| Viscosity, Centipoises at 600 R. P. M | 55 | 47 | 42 | 32 | 25 |
|---|---|---|---|---|---|
| Gel Strength, Initial, Gms | 24 | 21 | 12 | 4 | 4 |
| Gel Strength, 10 Min., Gms | 79 | 64 | 52 | 31 | 5 |

AFTER 24 HR. AT 180° F.—NOT SPRAY DRIED

| Viscosity, Centipoises at 600 R. P. M | 56 | 48 | 42 | 36 | 31 |
|---|---|---|---|---|---|
| Gel Strength, Initial, Gms | 24 | 19 | 9 | 5 | 4 |
| Gel Strength, 10 Min., Gms | 78 | 69 | 49 | 34 | 6 |

*Example 2*

The procedure of Example 1 was repeated employing an addition agent mixture consisting of 80% oligosaccharide mixture and 20% sodium tetraphosphate.

[80% oligosaccharide–20% sodium tetraphosphate.]

INITIAL RESULTS—SPRAY DRIED

| Percent Addition Agent, by volume | None | 0.0025 | 0.01 | 0.04 | 0.1 |
|---|---|---|---|---|---|
| Lbs. Addition Agent, per barrel mud | None | 0.0087 | 0.035 | 0.14 | 0.35 |
| Viscosity, Centipoises at 600 R. P. M | 40 | 34 | 27 | 22 | 20 |
| Gel Strength, Initial, Gms | 16 | 9 | 4 | 4 | 4 |
| Gel Strength, 10 Min., Gms | 54 | 50 | 42 | 24 | 8 |

INITIAL RESULTS—NOT SPRAY DRIED

| Viscosity, Centipoises at 600 R. P. M | 39 | 35 | 33 | 28 | 25 |
|---|---|---|---|---|---|
| Gel Strength, Initial, Gms | 16 | 9 | 6 | 4 | 4 |
| Gel Strength, 10 Min., Gms | 59 | 54 | 49 | 34 | 12 |

AFTER 24 HR. AT 180° F.—SPRAY DRIED

| Viscosity, Centipoises at 600 R. P. M | 56 | 50 | 42 | 29 | 25 |
|---|---|---|---|---|---|
| Gel Strength, Initial, Gms | 21 | 24 | 13 | 4 | 4 |
| Gel Strength, 10 Min., Gms | 78 | 66 | 51 | 31 | 17 |

AFTER 24 HR. AT 180° F.—NOT SPRAY DRIED

| Viscosity, Centipoises at 600 R. P. M | 56 | 53 | 43 | 37 | 29 |
|---|---|---|---|---|---|
| Gel Strength, Initial, Gms | 24 | 19 | 10 | 6 | 4 |
| Gel Strength, 10 Min., Gms | 78 | 69 | 54 | 54 | 21 |

In the above table it will be seen that on initial addition of agent to the mud, comparable viscosity reduction was obtained by using 0.035 lb. per barrel of spray dried addition agent and 0.35 lb. per barrel of agent which had not been spray dried. After aging, comparable results were obtained with 0.14 and 0.35 lb. per barrel respectively.

*Example 3*

The procedure of Example 1 was repeated employing an addition agent consisting of 80% oligosaccharide mixture and 20% tetrasodium pyrophosphate.

[80% oligosaccharide–20% tetrasodium pyrophosphate]

INITIAL RESULTS—SPRAY DRIED

| Percent Addition Agent, by volume | None | 0.0025 | 0.01 | 0.04 | 0.1 |
|---|---|---|---|---|---|
| Lbs Addition Agent, per barrel mud | None | 0.0087 | 0.035 | 0.14 | 0.35 |
| Viscosity, Centipoises at 600 R. P. M | 39 | 34 | 30 | 26 | 23 |
| Gel Strength, Initial, Gms | 16 | 9 | 5 | 4 | 4 |
| Gel Strength, 10 Min., Gms | 54 | 49 | 39 | 16 | 6 |

INITIAL RESULTS—NOT SPRAY DRIED

| Viscosity, Centipoises at 600 R. P. M | 39 | 38 | 32 | 26 | 25 |
|---|---|---|---|---|---|
| Gel Strength, Initial, Gms | 16 | 9 | 4 | 4 | 4 |
| Gel Strength, 10 Min., Gms | 59 | 49 | 34 | 11 | 4 |

AFTER 24 HR. AT 180° F.—SPRAY DRIED

| Viscosity, Centipoises at 600 R. P. M | 53 | 42 | 39 | 31 | 24 |
|---|---|---|---|---|---|
| Gel Strength, Initial, Gms | 24 | 19 | 11 | 9 | 4 |
| Gel Strength, 10 Min., Gms | 79 | 59 | 46 | 29 | 9 |

AFTER 24 HR. AT 180° F.—NOT SPRAY DRIED

| Viscosity, Centipoises at 600 R. P. M | 56 | 47 | 42 | 35 | 29 |
|---|---|---|---|---|---|
| Gel Strength, Initial, Gms | 24 | 19 | 11 | 6 | 4 |
| Gel Strength, 10 Min., Gms | 78 | 69 | 54 | 30 | 9 |

In the above table it will be seen that improvement was obtained, on initial addition of spray dried agent to the mud, with as little as 0.0087 lb. per barrel, and the addition of 0.14 lb. per barrel of spray dried agent resulted in a mud viscosity comparable to 0.35 lb. per barrel of agent which had not been spray dried.

*Example 4*

The procedure of Example 1 was repeated except that the addition agent consisted of 80% oligosaccharide mixture and 20% tetra potassium pyrophosphate.

[80% oligosaccharide–20% tetra potassium pyrophosphate]

INITIAL RESULTS—SPRAY DRIED

| Percent Addition Agent, by volume | None | 0.0025 | 0.01 | 0.04 | 0.1 |
|---|---|---|---|---|---|
| Lbs. Addition Agent, per barrel mud | None | 0.0087 | 0.035 | 0.14 | 0.35 |
| Viscosity, Centipoises at 600 R. P. M | 39 | 37 | 31 | 26 | 23 |
| Gel Strength, Initial, Gms | 16 | 9 | 4 | 4 | 4 |
| Gel Strength, 10 Min., Gms | 54 | 44 | 32 | 10 | 4 |

INITIAL RESULTS—NOT SPRAY DRIED

| Viscosity, Centipoises at 600 R. P. M | 39 | 36 | 31 | 27 | 25 |
|---|---|---|---|---|---|
| Gel Strength, Initial, Gms | 16 | 9 | 4 | 4 | 4 |
| Gel Strength, 10 Min., Gms | 54 | 44 | 32 | 11 | 4 |

AFTER 24 HR. AT 180° F.—SPRAY DRIED

| Viscosity, Centipoises at 600 R. P. M | 54 | 48 | 43 | 35 | 28 |
|---|---|---|---|---|---|
| Gel Strength, Initial, Gms | 21 | 19 | 14 | 6 | 4 |
| Gel Strength, 10 Min., Gms | 79 | 59 | 46 | 30 | 11 |

AFTER 24 HR. AT 180° F.—NOT SPRAY DRIED

| Viscosity, Centipoises at 600 R. P. M | 54 | 48 | 42 | 37 | 30 |
|---|---|---|---|---|---|
| Gel Strength, Initial, Gms | 21 | 19 | 12 | 6 | 4 |
| Gel Strength, 10 Min., Gm | 79 | 56 | 39 | 29 | 14 |

*Example 5*

The procedure of Example 1 was repeated employing an addition agent consisting of 80% oligosaccharide mixture and 20% sodium tripolyphosphate.

[80% oligosaccharide–20% sodium tripolyphosphate.]

INITIAL RESULTS—SPRAY DRIED

| Percent Addition Agent, by volume | None | 0.0025 | 0.01 | 0.04 | 0.1 |
|---|---|---|---|---|---|
| Lbs. Addition Agent, per barrel mud | None | 0.0087 | 0.035 | 0.14 | 0.35 |
| Viscosity, Centipoises at 600 R. P. M | 39 | 33 | 30 | 24 | 22 |
| Gel Strength, Initial, Gms | 16 | 9 | 6 | 4 | 4 |
| Gel Strength, 10 Min., Gms | 54 | 49 | 39 | 22 | 6 |

INITIAL RESULTS—NOT SPRAY DRIED

| Viscosity, Centipoises at 600 R. P. M | 40 | 33 | 29 | 28 | 25 |
|---|---|---|---|---|---|
| Gel Strength, Initial, Gms | 16 | 9 | 5 | 4 | 4 |
| Gel Strength, 10 Min., Gms | 54 | 54 | 44 | 24 | 14 |

*Example 6*

The procedure of Example 1 was repeated except that the addition agent consisted of 80% oligosaccharide mixture and 20% sodium metaphosphate.

[80% oligosaccharide–20% sodium metaphosphate.]

INITIAL RESULTS—SPRAY DRIED

| Percent Addition Agent, by volume | None | 0.0025 | 0.01 | 0.04 | 0.1 |
|---|---|---|---|---|---|
| Lbs. Addition Agent, per barrel mud | None | 0.0087 | 0.035 | 0.14 | 0.35 |
| Viscosity, Centipoises at 600 R. P. M | 39 | 39 | 37 | 34 | 29 |
| Gel Strength, Initial, Gms | 16 | 14 | 11 | 6 | 4 |
| Gel Strength, 10 Min., Gms | 54 | 51 | 44 | 34 | 28 |

INITIAL RESULTS—NOT SPRAY DRIED

| Viscosity, Centipoises at 600 R. P. M | 39 | 39 | 39 | 39 | 32 |
|---|---|---|---|---|---|
| Gel Strength, Initial, Gms | 16 | 16 | 12 | 9 | 5 |
| Gel Strength, 10 Min., Gms | 54 | 52 | 49 | 39 | 31 |

We claim:

1. A method of preparing a drilling mud addition agent which comprises mixing together in aqueous media from about 10 parts to about 50 parts of an alkali metal molecularly dehydrated phosphate and from about 90 parts to about 50 parts of an oligosaccharide mixture consisting principally of pentosans and hexosans obtained from thermally hydrolyzed lignocellulose and composed of arabinose, mannose, galactose, glucose, and xylose sugar units, and thereafter spray drying the mixture.

2. A method of preparing a drilling mud addition agent which comprises mixing together in aqueous media from about 10 parts to about 50 parts of sodium acid pyrophosphate and from about 90 parts to about 50 parts of an oligosaccharide mixture consisting principally of pentosans and hexosans obtained from thermally hydrolyzed lignocellulose and composed of arabinose, mannose, galactose, glucose, and xylose sugar units, and thereafter spray drying the mixture.

3. A method of preparing a drilling mud addition agent which comprises mixing together in aqueous media from about 10 parts to about 50 parts of sodium tetraphosphate and from about 90 parts to about 50 parts of an oligosaccharide mixture consisting principally of pentosans and hexosans obtained from thermally hydrolyzed lignocellulose and composed of arabinose, mannose, galactose, glucose, and xylose sugar units, and thereafter spray drying the mixture.

4. A method of preparing a drilling mud addition agent which comprises mixing together in aqueous media from about 10 parts to about 50 parts of tetrasodium pyrophosphate and from about 90 parts to about 50 parts of an oligosaccharide mixture consisting principally of pentosans and hexosans obtained from thermally hydrolyzed lignocellulose and composed of arabinose, mannose, galactose, glucose, and xylose sugar units, and thereafter spray drying the mixture.

5. A method of preparing a drilling mud addition agent which comprises mixing together in aqueous media from about 10 parts to about 50 parts of tetra potassium pyrophosphate and from about 90 parts to about 50 parts of an oligosaccharide mixture consisting principally of pentosans and hexosans obtained from thermally hydrolyzed lignocellulose and composed of arabinose, mannose, galactose, glucose, and xylose sugar units, and thereafter spray drying the mixture.

References Cited in the file of this patent

UNITED STATES PATENTS

| 2,486,922 | Strain | Nov. 1, 1949 |
|---|---|---|
| 2,491,436 | Barnes | Dec. 13, 1949 |
| 2,518,439 | Fischer et al. | Aug. 15, 1950 |
| 2,549,142 | Thompson | Apr. 17, 1951 |
| 2,620,300 | Given | Dec. 2, 1952 |